US006738771B2

(12) United States Patent
Fujihara

(10) Patent No.: US 6,738,771 B2
(45) Date of Patent: May 18, 2004

(54) DATA PROCESSING METHOD, COMPUTER READABLE RECORDING MEDIUM, AND DATA PROCESSING DEVICE

(75) Inventor: Mutsumi Fujihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 09/960,745

(22) Filed: Sep. 24, 2001

(65) Prior Publication Data

US 2002/0059331 A1 May 16, 2002

(30) Foreign Application Priority Data

Oct. 31, 2000 (JP) ........................................ 2000-333498

(51) Int. Cl.$^7$ .............................................. G06F 17/30
(52) U.S. Cl. ................................................. 707/7; 707/1
(58) Field of Search ................................. 707/1, 3–5, 7, 707/100, 200, 205; 706/934; 345/565

(56) References Cited

U.S. PATENT DOCUMENTS

| 5,848,408 A | 12/1998 | Jakobsson et al. |
| 5,960,428 A | 9/1999 | Lindsay et al. |
| 6,003,024 A | 12/1999 | Bair et al. |
| 6,499,033 B1 * | 12/2002 | Vagnozzi ..................... 707/101 |
| 6,591,269 B1 * | 7/2003 | Ponnekanti ................. 707/100 |

FOREIGN PATENT DOCUMENTS

| JP | 6-149634 | 5/1994 |
| JP | 6-309295 | 11/1994 |

OTHER PUBLICATIONS

Mutsumi Fujihara, et al., "Simulation Through Explicit State Description and Its Application to Semiconductor Fab Operation," Proceedings of the 1992 Winter Simulation Conference, 1992, pp. 899–907.
R. Kimball, XP–002243859, pp. 180–193, "The Data Warehouse Lifecycle Toolkit".
R. Kimball, XP–002243860, chapter 6, pp. 100–106, "The Data Warehouse Toolkit".

* cited by examiner

*Primary Examiner*—Alford Kindred
(74) *Attorney, Agent, or Firm*—Oblon, Spivak, McClelland, Maier & Neustadt, P.C.

(57) ABSTRACT

The object of the present invention is to provide a data processing method, a computer readable recording medium, and a data processing device with which it is possible to compactly store and surely and easily retrieve data items having overlapping portions. In the data processing method used for sorting and storing a plurality of data records for the purpose of retrieval, the field values used as sort keys are stored in storage areas indicated by pointers. In such a case, it is possible to distinguish records having the same field value but representing different information items without adding extra keys by using not only field values but also pointers as keys.

15 Claims, 7 Drawing Sheets

DATA PROCESSING METHOD, COMPUTER READABLE RECORDING MEDIUM, AND DATA PROCESSING DEVICE

CROSS REFERENCE TO RELATED APPLICATION

This application is based upon and claims benefit of priority from the prior Japanese Patent Applications No. 2000-333498, filed on Oct. 31, 2000; the entire contents of which are incorporated herein by reference.

BACKGROUND OF THE INVENTION

1. Field of the Invention

The present invention relates to a data processing method, a computer readable recording medium, and a data processing device. More specifically, the present invention relates to a data processing method, a computer readable recording medium, and a data processing device, with which it is possible to efficiently store and retrieve data in a storage area of a computer, etc., or used in various application systems executable via computer etc.

2. Related Background Art

Conventionally, the sorting and storing of a plurality of data records has been performed for the purpose of retrieval. When a data record is retrieved, the value (a number, a character string, etc.) of a specific field of the data record is used as a sort key. If such specific fields of two or more records have the same value but the specific fields should represent different items of information, as in the case of representing human names, it is common to add an extra key to each record to differentiate the information items.

However, this method requires additional storage area for storing records. Moreover, this method requires a data user or a data collector to do extra tasks, i.e., to give an extra key to each data record for securing the distinctiveness of each data record.

There is another method, in which a data record does not store a field value, but stores a pointer for making access to a storage area where the corresponding field value is stored. In this way, a plurality of records can share a field value. The term "pointer" in this case indicates not only an address of a storage area, but also various information items which are used for determining a suitable storage area to be accessed, including, e.g., representation of information for calculating the location of the storage area.

However, this method is used only for obtaining an effect of economizing the storage area by substituting the pointer for the field value used for a plurality of records. Therefore, this method has not been used for solving the above-described problem. That is, in a data processing system using only specific field values as sort keys, this method has been only one way of representing (implementing) field values, and has had no influence on the sorting functions.

SUMMARY OF THE INVENTION

Given the above-described problems, the object of the present invention is to provide a data processing method, a computer readable recording medium, and a data processing device with which data items including overlapping portions can be compactly stored, and surely and easily retrieved.

In order to the above-described objective, according to one aspect of embodiments of the present invention, a data processing method comprises: storing a plurality of records each having a plurality of fields in a first storage area; storing a field value in a second storage area; storing a pointer to the second storage area storing the field value in at least one of the fields; and sorting the records by using at least one of the pointer to determine sorting order among the records.

The field value stored in the second storage area indicated by the pointer may be compared immediately before the pointer in determining sorting order among the records.

A retrieval operation may be performed on the sorted records by using the pointer to the second storage area storing the field value as one of searching keys.

The retrieval operation may be any efficient retrieval operation, such as a binary search, performed on the sorted records.

According to another aspect of embodiments of the present invention, in a computer readable recording medium storing a program code for managing data items, the program comprises: program code configured to store a plurality of records each having a plurality of fields in a first storage area; program code configured to store a field value in a second storage area; program code configured to store a pointer to the second storage area storing the field value in at least one of the fields; and program code configured to sort the records by using at least one of the pointer to determine sorting order among the records.

According to a further aspect of embodiments of the present invention, a data processing device comprises: a data input section configured to input a field value; a data storing section; and a data processing control section configured to control storing a plurality of records each having a plurality of fields in a first storage area of the data storing section; storing a field value in a second storage area of the data storing section; storing a pointer to the second storage area storing the field value in at least one of the fields; and sorting the records by using at least one of the pointer to determine sorting order among the records.

Embodiments of the present invention also include various kinds of software capable of executing the above-described data processing method. Further, the present invention includes various applications using the above-described data processing method.

The term "recording medium" is not limited to, e.g., hard disk (HD), DVD-RAM, DVD-ROM, flexible disk (FD), and CD-ROM, but includes memory devices such as RAM, ROM, etc.

Moreover, the program to be recorded on the above-mentioned media can be encrypted, modified, or compressed to be distributed through a wired line or a wireless line, such as Intranet, Internet, etc. Alternatively, such an encrypted, modified, or compressed program can be stored in a recording medium to be distributed.

DESCRIPTION OF THE EMBODIMENTS

According to the present invention, in a data processing method for sorting and storing a plurality of data records for the purpose of retrieval, when a field value to be used as a sort key is stored in a storage area indicated by a pointer, it is possible to distinguish two or more records having the same field value but representing different items of information without adding an extra key by using the pointer as a key instead of the field value, or using both the field value and the pointer. Since the records are distinguished based on the order of keys, by using both the field values and the pointers, the records having the same key in a specific field, representing the same information item, are sequentially sorted in the same manner as in the case where an extra key is added to each record. As a result, at the time of a retrieval operation, it is possible to effectively distinguish such records.

Hereinafter, using an example of a database having a registrant table (DB1) and a telephone number table (DB2), preferred embodiments of the present invention will be described in detail.

Figure 1:
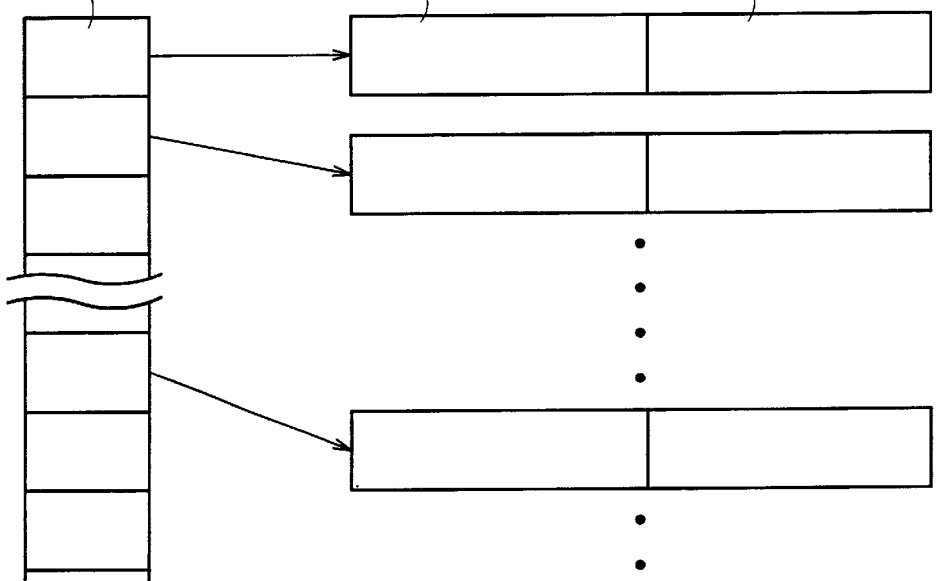
FIG. 1 is a diagram schematically showing the data structure of a registrant table DB1 according to an embodiment of the present invention.

FIG. 1 schematically shows the data structure of the registrant table DB1.

Figure 2:
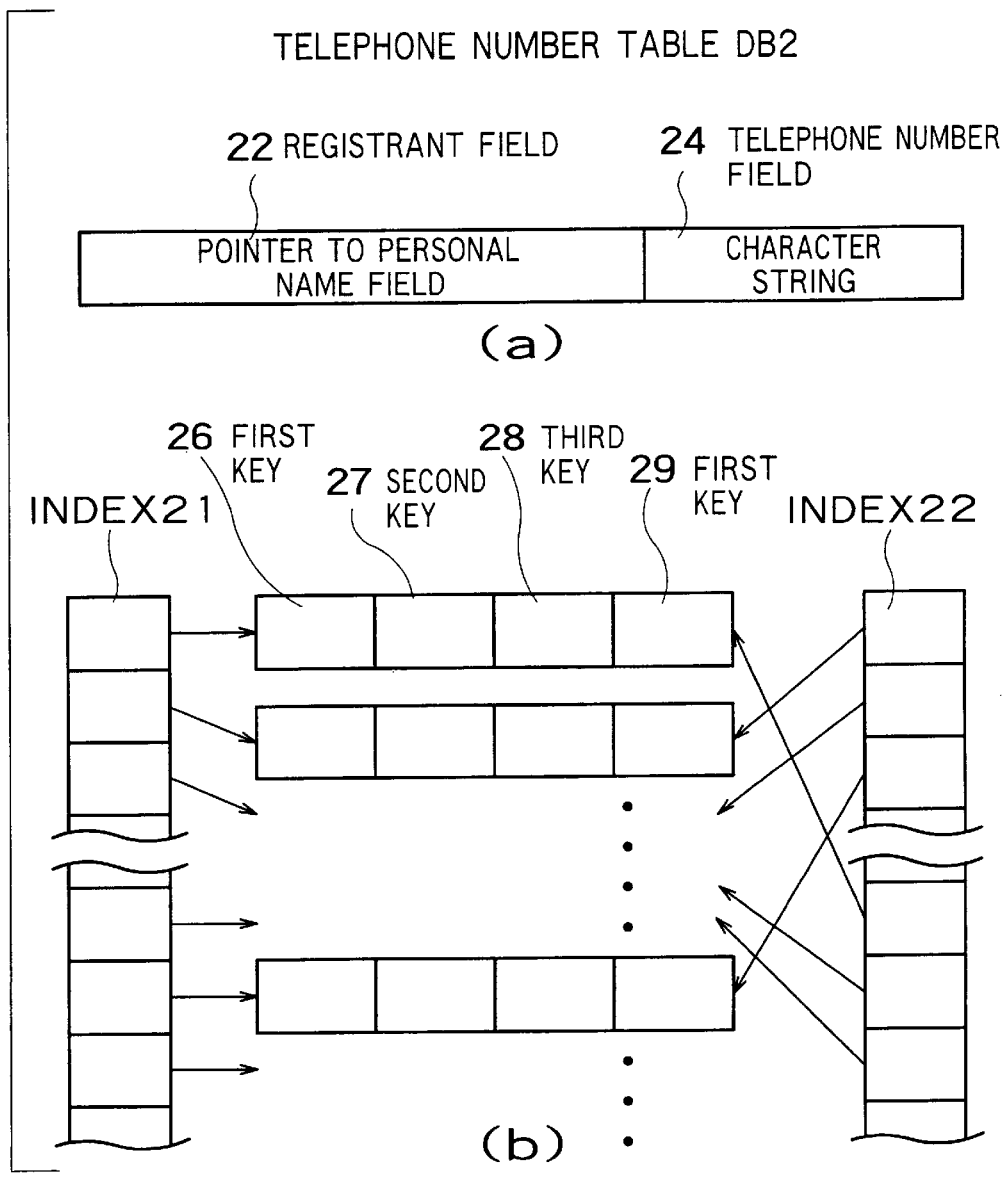
FIG. 2 is a diagram schematically showing the data structure of a telephone number table DB2 according to an embodiment of the present invention.

FIG. 2 schematically shows the data structure of the telephone number table DB2.

Records of each table are stored in a storage area of a storage device which is capable of reading/writing data by designating an address (location in the storage device). Either a field value (a data item such as a character string) or a pointer to other fields is stored in each field of a record (FIGS. 1(a), 2(a)). As shown in FIGS. 1(b) and 2(b), besides the records, each table has an "index" for retrieving a record. An index is obtained by sorting the records using as a combined key the field values, the pointers, or field values indicated by the pointers stored in one or more fields in each record.

Here, the term "combined key" means a group of keys (in this case, field values and pointers) each having a priority level. Only when each pair of keys of same higher priority levels (e.g. the 1st, the 2nd) coincides each other, the pair of keys of the highest priority level (the 3rd) among the rest of priority levels should be compared to determine which one of two sets of a combined key is the former/the latter or whether both are the same.

In this embodiment, the index is an arrangement of the pointers to the records sorted in a predetermined order. However, the index may be obtained any other way as long as it has a data structure maintaining the sorted order among the records when adding/deleting pointers and enabling efficient data retrieval with a specified combined key, such as in a binary search.

As shown in FIG. 1(a), a record in the registrant table DB1 has two fields, i.e., an address field 12 and a personal name field 14. Each address field 12 stores address data of a registrant. Each personal name field 14 stores name data of a registrant. The registrant table DB1 includes the same number of records as that of registrants, each record having a pair of an address field 12 and a personal name field 14.

Further, the registrant table DB1 includes an index INDEX11 having a first key 16 of an "address" and a second key 18 of a "personal name" (FIG. 1(b)). For the same pair of "address" and "personal name", only one record is registered in the registrant table DB1.

For example, even if a single person named "Taro Tokyo" (of which "Taro" is the first name, and "Tokyo" is the surname) has registered a plurality of telephone numbers, only one pair of an address data item and a personal name data item can be registered in the DB1 for that person.

On the contrary, if a different person having the same personal name, "Taro Tokyo" has registered a telephone number, the DB1 has a different record including an address data item and a name data item for that different person.

As shown in FIG. 2(a), each record of the telephone number table 2 has a registrant field 22 for storing a pointer to a personal name field 16 of a registrant record, and a telephone number field 24 for storing a telephone number. The telephone number table DB2 includes the same number of records as that of the registered telephone number, each record having a pair of a registrant field 22 and a telephone number field 24.

For example, when a person named "Taro Tokyo" has a telephone number "03-1234-5678", the registrant field 22 stores the pointer to the name field of that person, e.g., "120 (which is the address of the storage area in which that name field of the registrant record in the registrant table is stored)", and the telephone number field 24 stores a character string "0312345678".

As shown in FIG. 2(b), the telephone number table DB2 further includes indexes INDEX21 AND INDEX22. The INDEX21 includes this combined key consisting of the first key 26, which is the value of the personal name field 12 indicated by the pointer stored in the registrant field 22, the second key 27, which is a pointer to the personal name field stored in the registrant field 22, and the third key 28, which is the value of the telephone number field 24. The INDEX22 has a single key 29 which is the value of the telephone number field 24. We call this single key "the first key" as the special case of a combined key.

For example, if a person named "Taro Tokyo" has registered two telephone numbers, the first keys in the INDEX21 are the same, i.e., "Taro Tokyo", and the second keys are also the same, i.e., the pointer to the personal name field for "Taro Tokyo", such as "120".

If there is another person who is also named "Taro Tokyo", the first key in the INDEX21 is "Taro Tokyo", but the second key is a different pointer, e.g., "180". Thus, the identity of each data item can be surely and easily verified by using a pointer as a part of a sort key.

Hereinafter, the operations provided by the data processing system according to the present invention, i.e., the "registering", "deleting", and "retrieving" operations will be described.

(Registering Operation)

Via the registering operation, new data items are added to the database. In this embodiment, the data items to be added are registrant addresses, registrant names, and registrant telephone numbers. Hereinafter, the procedure by which the registering operation is carried out will be described.

Figure 3:
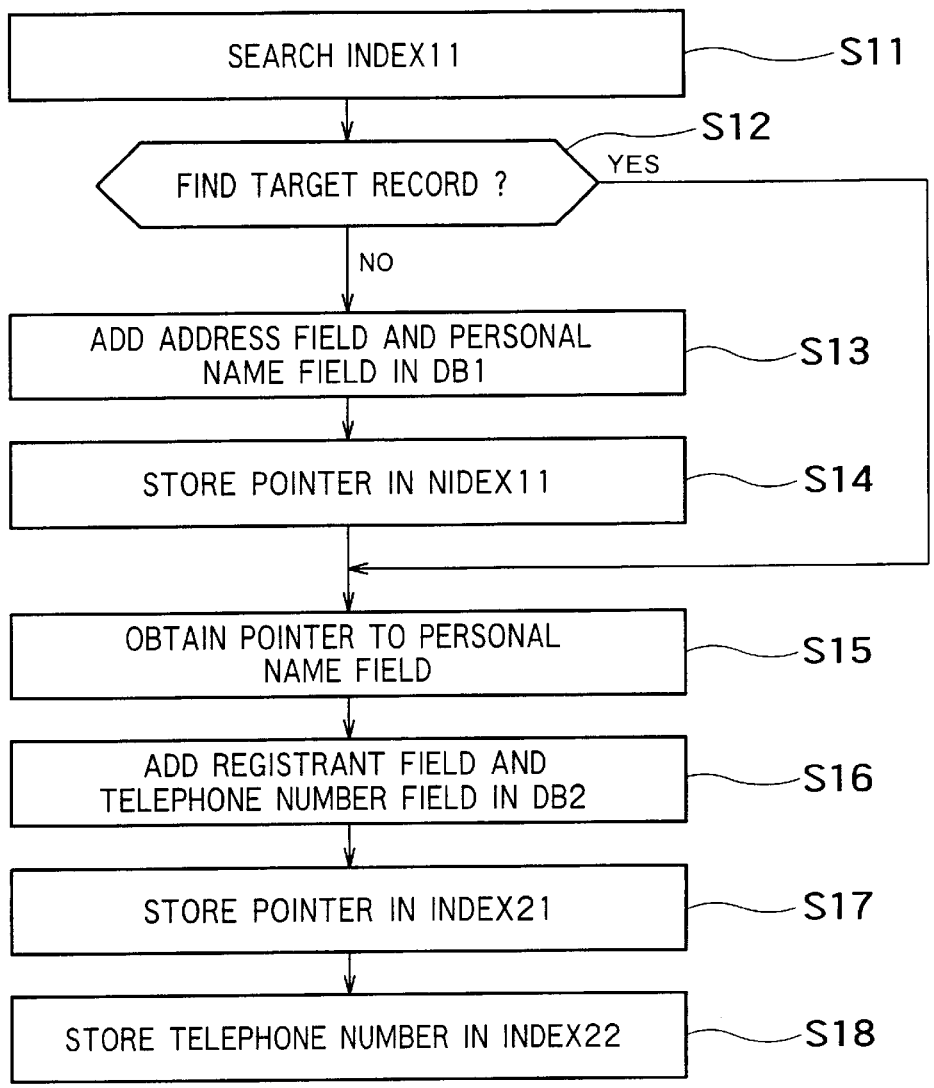
FIG. 3 is a flow chart exemplarily showing the procedure by which a registering operation is carried out according to an embodiment of the present invention.

FIG. 3 is a flow chart showing the procedure by which the registering operation is carried out.

(1). First, the INDEX11 of the registrant table DB1 is searched with the first key being the registrant address and the second key being the registrant name. When the target record is found (step S12 "yes"), a pointer to the personal name field of that record is obtained at step S15.

If the target record is not found (step S12 "no"), an additional record A having the registrant address in the address field and the registrant name in the personal name filed is created and added to the DB1. At the same time, the pointer to the additional record A is stored in the INDEX11 (step S14). That is, the INDEX11 is searched to determine the location to which the pointer to the additional record A is inserted. Then, the pointers stored after that location are moved backward one by one, and the pointer to the additional record A is stored at that location. After that, the pointer to the personal name field of the additional record A is obtained (step S15).

(2). Next, an additional record B having the pointer to the personal name field obtained in the above (1) in the registrant field 22 and a registrant telephone number in the telephone number field 24 is created and added to the DB2 (step S16). Then, at step S17, a pointer is added to the INDEX21. That is, the INDEX21 is searched for the location to which the pointer to the additional record B is inserted with the first key being the content of the personal name field indicated by the pointer obtained in the above (1), the second key being the pointer to the personal name filed, and the third key being the telephone number. Then, the pointers stored after that location are moved backward one by one, and the pointer to the additional record B is stored at that location. In the same way, the pointer to the additional record B is also inserted to the INDEX22 with the first key being the telephone number.

(Deleting Operation)

In this embodiment, the operation procedure to delete a data item based on a telephone number will be described. That is, the input data item is a telephone number.

Figure 4:
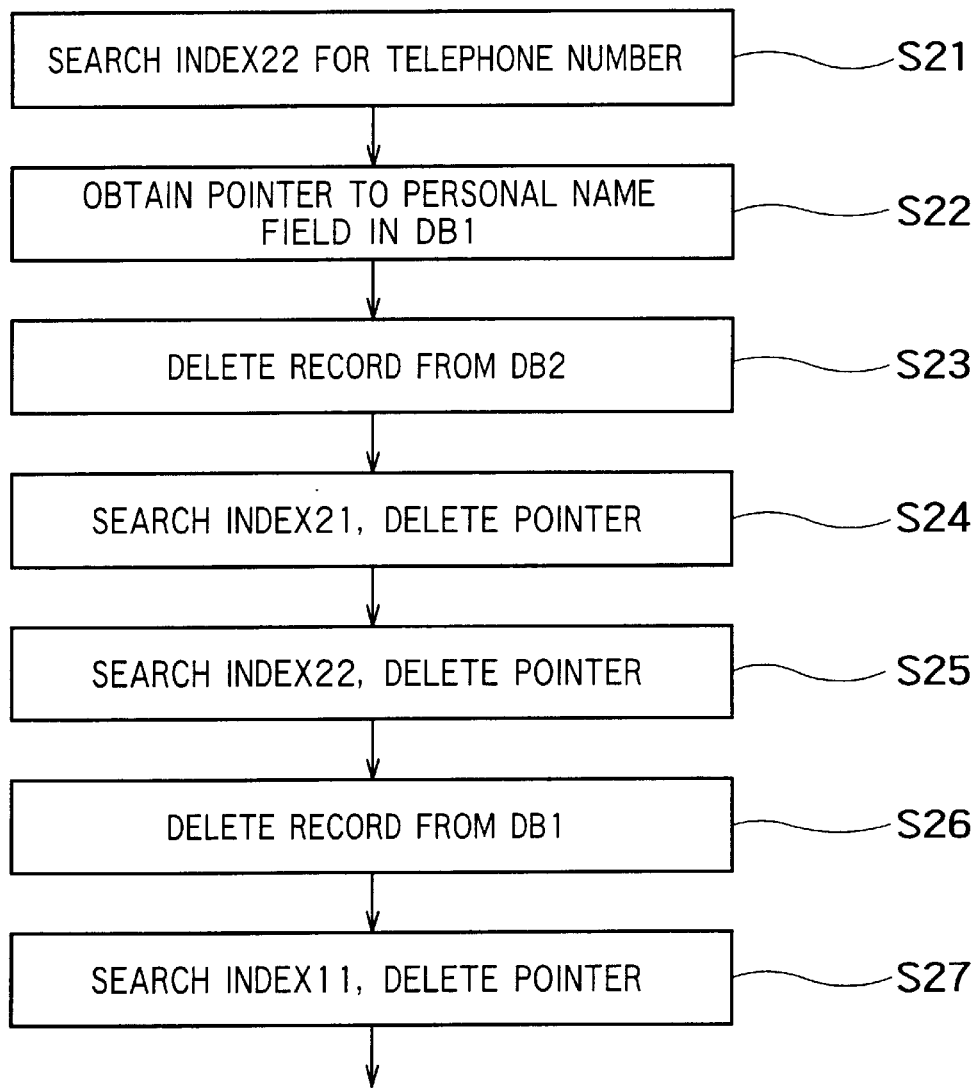
FIG. 4 is a flow chart exemplarily showing the procedure by which a deleting operation is carried out according to an embodiment of the present invention.

FIG. 4 is a flow chart showing the procedure of the deleting operation.

(1). At step S21, the INDEX22 is searched for a target record in the DB2 with the first key being a telephone number to be deleted.

(2). Next, at step S22, the pointer to the personal name field of a target record in the DB1 is obtained from the registrant field of the record searched in the above (1).

(3). The record in the DB1 including the personal name field indicated by the pointer obtained in the above (2) is determined. This process can be easily accomplished due to the structure of each data record.

(4). The record determined in the above (1) is deleted from the DB2. Specifically, at the same time the record is deleted (step S23), the INDEX21 is searched for the location where the pointer to the record is stored, with the first key being the value of the personal name field of the record obtained in the above (3), the second key being the pointer to the personal name field, and the third key being the telephone number. The pointers stored after that location is moved forward one by one to delete the pointer from the INDEX21 (step S24). Further, the INDEX22 is searched with the first key being the telephone number, and in the same manner as the case of the INDEX21, the pointer to the target record is deleted from the INDEX22 (step S25).

(5). The record determined in the above (3) is deleted from the DB1 (step S26). Specifically, at the same time as the record is deleted, the INDEX11 is searched for the location storing the pointer to the record, with the first key being the address and second key being the personal name. Further, the pointers stored after that location is moved forward one by one to delete the target pointer from the INDEX11 (step S27).

Before executing (5), it is necessary to confirm that the registrant to be deleted does not have a telephone number anymore. This confirmation can easily be done via the INDEX21 by a similar procedure to (4).

(Retrieving Operation)

In this embodiment, the operation procedure to retrieve a telephone number based on an address and a personal name will be described. That is, the input data items are an address and a personal name, and the output data item is a list of telephone numbers the registrant specified by the input data items has registered.

Figure 5:
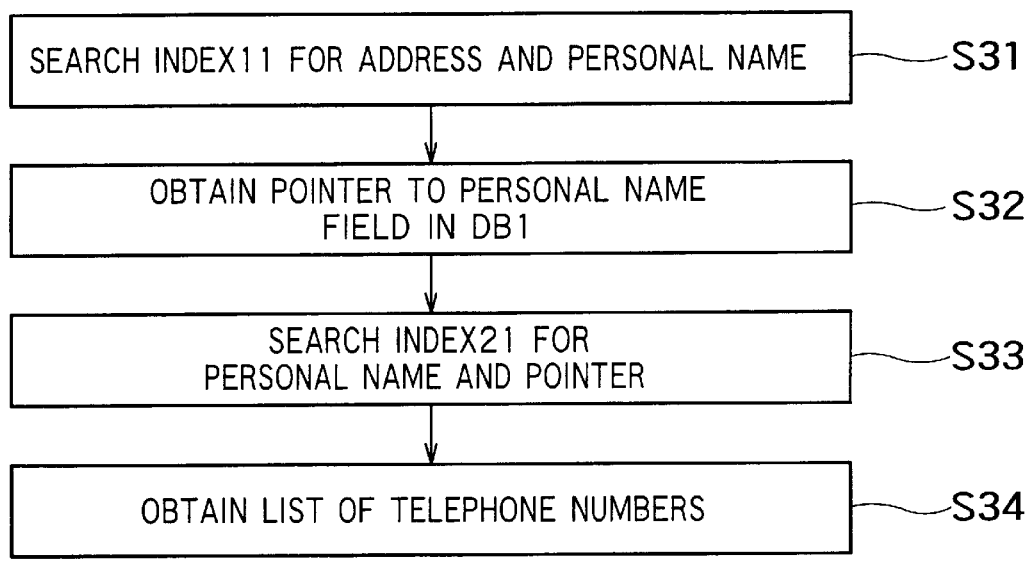
FIG. 5 is a flow chart exemplarily showing the procedure by which a retrieving operation is carried out according to an embodiment of the present invention.

FIG. 5 is a flow chart showing the procedure by which the retrieving operation is carried out.

(1). At steps S31 and S32, the INDEX11 is searched for the pointer to the personal name field of the target record in the DB1, with the first key being the address and the second key being the personal name.

(2). Next, the INDEX21 is searched with only a few higher-order keys. In this embodiment, e.g., only the first key, which is the value of the personal name field obtained in the above (1), and the second key, which is the pointer to the personal name field as the second key (step S33). In the INDEX21, the order of the pointers to the records is determined based on the comparison of all the first to third element keys of each combined key. Since there is no contradiction between this order and the order determined based on the first and the second keys, the index can be searched by any efficient method such as a binary search, using only the first and the second keys. Since the pointers to the records for which both the first key and the second key are matching are stored in successive elements in this index, such pointers can be simultaneously read efficiently, as the result of the above-described retrieving operation. In the last step, the values of the number fields of the records are read (step S34).

The above-described advantageous effects of the present invention are especially remarkable in the above retrieving operation. According to the data structure of the present invention, it is possible to effectively retrieve records belonging to a specific registrant in the DB2. The reason for this is that since the pointer to the personal name field of the record in the DB1 corresponding to a specific registrant is used as the second key for searching the INDEX21, it is possible to effectively retrieve the corresponding records in the DB2 at a time.

In the conventional methods, each record in the DB2 has three fields, i.e., the address field, the personal name field, and the telephone number field, and the same address data item and the personal name data item are redundantly stored in both the DB1 and the DB2. Further, the DB2 includes redundant data items if there are a plurality of records having overlapping portions, which requires an extra storage area. Moreover, if an index similar to the INDEX21 in the DB2 is made for the purpose of retrieval, comparing operations should be repeated for the same address and personal name, which would decrease the retrieval efficiency.

Even if each registrant field stores a pointer in a manner similar to this embodiment, the pointers are not used as keys to sort or search the index in the conventional methods. Therefore, in order to determine the record relating to a specific registrant as efficiently as the retrieving operation of this embodiment, comparisons of both the addresses and personal names stored in the storage areas indicated by the pointer are required. Since the comparison of such keys requires more time than the comparison of pointers, it takes much time to retrieve the target record.

In order to perform a comparison of data items in less time, a specific ID number may be given to each registrant who can be identified by the address and personal name, and each record in the DB1 and the DB2 may be expanded to include the ID number as a part of each data item. However, this requires an extra storage area and an extra procedure to determine and issue a specific ID number.

As described above, in the data processing method according to the present invention, when an index used for sorting and retrieving records is created and maintained, pointers to storage areas storing field values are used as keys. Therefore, it is possible to perform an efficient retrieval operation.

Next, a data processing device which is capable of executing the data processing method according an embodiment of the present invention will be described.

Figure 6:
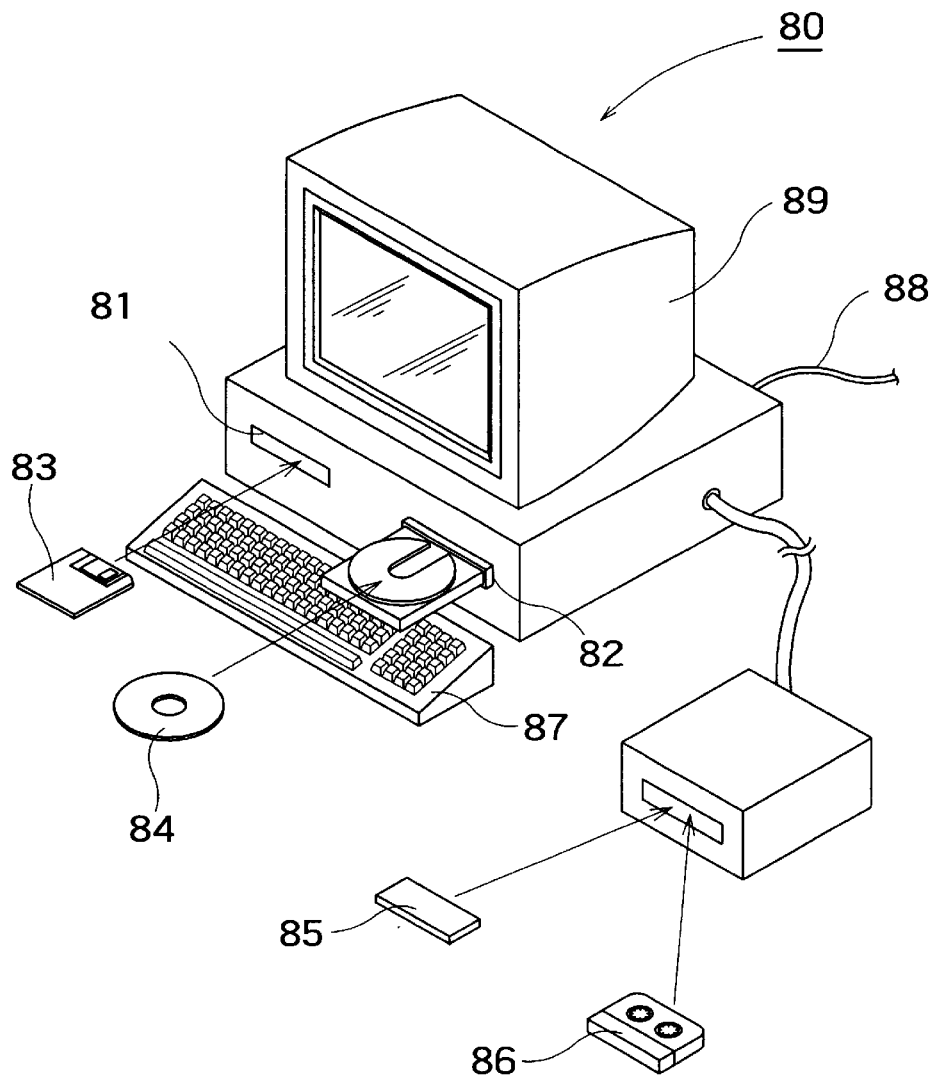
FIG. 6 is a perspective view of a data processing device realizing the data managing method according to an embodiment of the present invention on hardware.

FIG. 6 is a perspective view of a data processing device in which the above-described data processing method is realized on hardware.

Figure 7:
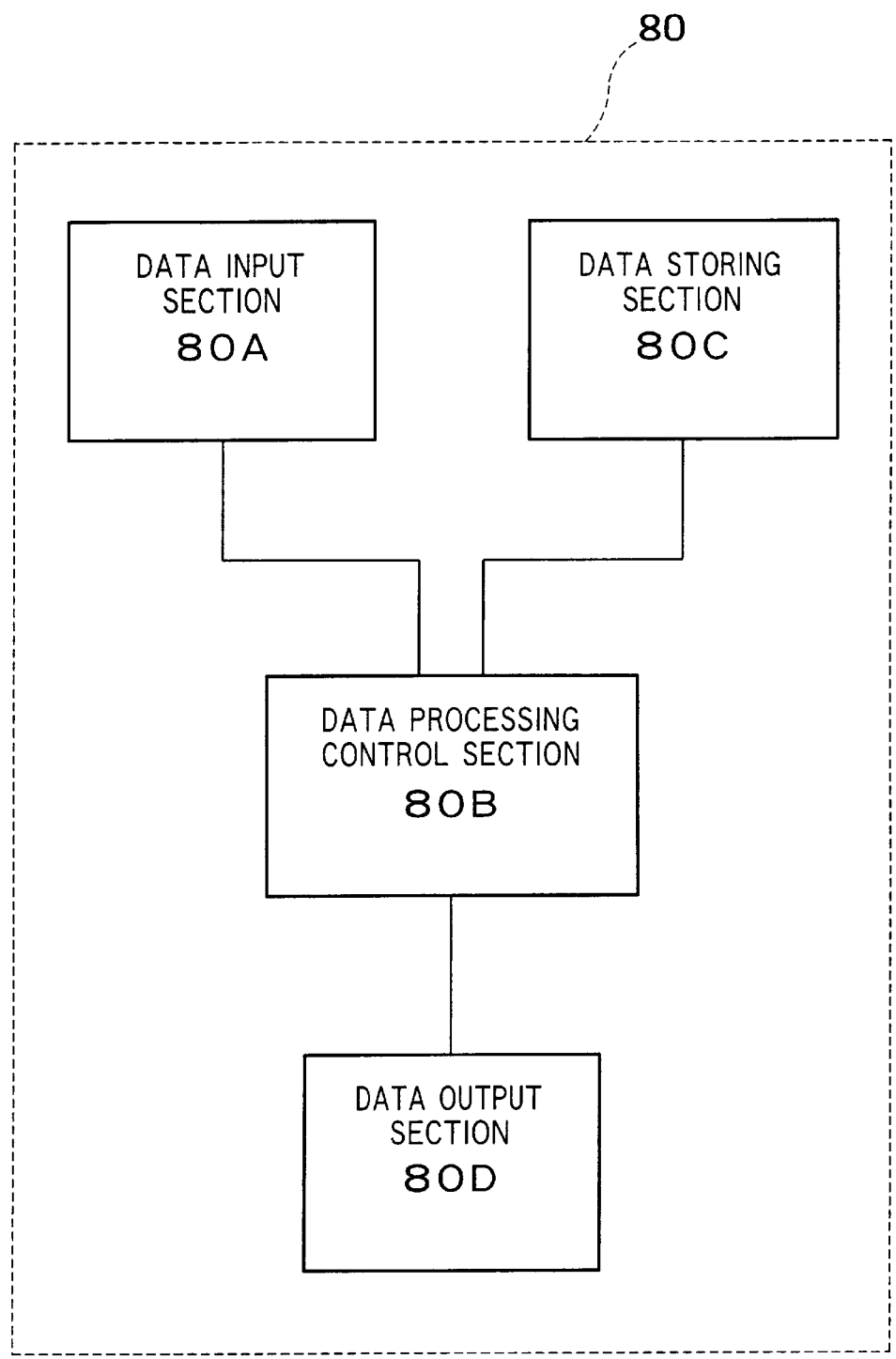
FIG. 7 is a block diagram showing the structure of the main part of the data processing device according to an embodiment of the present invention.

FIG. 7 is a block diagram showing the structure of the main section of the data processing device shown in FIG. 6.

A data processing device 80 includes a data input section 80A, a data processing control section 80B, a data storing section 80C, and a data output section 80D.

The data input section 80A inputs data items to be managed from the outside. As input means, the data input section 80A includes, e.g., a floppy disk unit (floppy disk drive) 81, an optical disc unit (optical disc drive) 82, etc. The data items stored in a recording medium, such as a floppy disk 83 and an optical disc 84 such as a CD-ROM and a DVD disc, can be inputted into the system by performing a predetermined reading operation after inserting the floppy disk 83 into the loading slot of the floppy disk drive 81, or inserting the optical disc 84 into the loading slot of the optical disc drive 81. Further, it is possible to use other recording medium, e.g., a ROM85 as a semiconductor memory device and a cassette tape 86 as a magnetic tape device by connecting a predetermined drive unit to the data input section 80A. In addition, data items may be inputted from a keyboard 87, or from other computer system or data outputting device through a network line 88.

The data items thus inputted are stored in the data storing section 80C. As mentioned previously with reference to FIGS. 1–5, data items are stored such that in a plurality of records each having a plurality of fields, at least one of the fields includes a pointer to the storage area storing a field value. The records are sorted using the pointers as part of the combined keys. The data processing control section 80B executes the above procedure. Further, the data processing control section 80B performs the data registering operation, the data deleting operation, and the data retrieving operation as mentioned previously with reference to FIGS. 3–5.

As the need arises, the data items managed, sorted, and retrieved in the above-described manner are outputted by the data output section 80D. The data output section 80D outputs a desired data item through, e.g., a display 89, a recording medium such as the floppy disk 83, the network line 88, etc.

In addition, in the present invention, a semiconductor memory device such as a RAM may be used as the data storing section 80C for storing data items. As a result, it is possible to extract and process data items at a high speed, thereby considerably improving the data processing performance as compared with the conventional devices.

The present invention further includes software with which it is possible to execute the data processing method as mentioned previously with reference to FIGS. 1–5. The software may be stored in a recording medium such as the optical disc 84 and downloaded to the data processing control section 80B of the data processing device 80 in a manner similar to the procedure described with reference to the data input section 80A. Alternatively, the software may be downloaded through the network line 88.

As described above, according to the present invention, when an index used for sorting and retrieving records is created and maintained, pointers to the storage areas storing field values are used as a part of sorting keys. As a result, it is possible to efficiently use the storage areas, and to perform an efficient retrieval operation. Thus, the present invention brings great benefits to the related industries.

What is claimed is:

1. A data processing method comprising:
   storing a plurality of records each having a plurality of fields in a first storage area;
   storing a field value in a second storage area;
   storing a pointer to said second storage area storing said field value in at least one of said fields; and
   sorting said records by using said pointer as a part of a sort key of each of said records to determine sorting order among said records.

2. The data processing method according to claim 1, wherein the field value stored in the second storage area indicated by said pointer is compared immediately before the pointer in determining sorting order among said records.

3. The data processing method according to claim 1, wherein a retrieval operation is performed on said sorted records by using the pointer to the second storage area storing the field value as one of searching keys.

4. The data processing method according to claim 3, wherein said retrieval operation is a binary search performed on said sorted records.

5. The data processing method according to claim 3, wherein the field value stored in the second storage area indicated by said pointer is compared immediately before the pointer in determining sorting order among said records.

6. A computer readable recording medium storing a program code for managing data items, said program comprising:
   program code configured to store a plurality of records each having a plurality of fields in a first storage area;
   program code configured to store a field value in a second storage area;
   program code configured to store a pointer to said second storage area storing said field value in at least one of said fields; and
   program code configured to sort said records by using said pointer as a part of a sort key of each of said records to determine sorting order among said records.

7. The computer readable recording medium according to claim 6, wherein the field value stored in the second storage area indicated by said pointer is compared immediately before the pointer in determining sorting order among said records.

8. The computer readable recording medium according to claim 6, wherein a retrieval operation is performed on said sorted records by using the pointer to the second storage area storing the field value as one of searching keys.

9. The computer readable recording medium according to claim 8, wherein said retrieval operation is a binary search performed on said sorted records.

10. The computer readable recording medium according to claim 8, wherein the field value stored in the second storage area indicated by said pointer is compared immediately before the pointer in determining sorting order among said records.

11. A data processing device comprising:
   a data input section configured to input a field value;
   a data storing section; and
   a data processing control section configured to control storing a plurality of records each having a plurality of fields in a first storage area of the data storing section; storing a field value in a second storage area of the data storing section; storing a pointer to said second storage area storing said field value in at least one of said fields; and sorting said records by using said pointer as a part of a sort key of each of said records to determine sorting order among said records.

12. The data processing device according to claim 11, wherein the field value stored in the second storage area indicated by said pointer is compared immediately before the pointer in determining sorting order among said records.

13. The data processing device according to claim 11, wherein said data processing control section performs a retrieval operation by using the pointer to the second storage area storing the field value as one of searching keys.

14. The data processing device according to claim 13, wherein said retrieval operation performed by said data processing control section is a binary search performed on said sorted records.

15. The data processing device according to claim 13, wherein the field value stored in the second storage area indicated by said pointer is compared immediately before the pointer in determining sorting order among said records.

* * * * *